United States Patent
Muroya

[19]

[11] Patent Number: 6,160,914
[45] Date of Patent: Dec. 12, 2000

[54] HANDWRITTEN CHARACTER VERIFICATION METHOD AND APPARATUS THEREFOR

[75] Inventor: Masami Muroya, Tokyo, Japan

[73] Assignee: Cadix Inc., Tokyo, Japan

[21] Appl. No.: 08/989,081

[22] Filed: Dec. 11, 1997

[30] Foreign Application Priority Data

Nov. 8, 1996 [JP] Japan ..................................... 8-312761

[51] Int. Cl.$^7$ ...................................................... G06K 9/00
[52] U.S. Cl. ........................... 382/187; 382/120; 382/215
[58] Field of Search .................................... 382/119, 120, 382/121, 122, 123, 187, 18, 209, 215, 218

[56] References Cited

U.S. PATENT DOCUMENTS

| | | | |
|---|---|---|---|
| 5,040,222 | 8/1991 | Muroya ................................... | 382/123 |
| 5,347,589 | 9/1994 | Meeks et al. ............................ | 382/119 |
| 5,550,931 | 8/1996 | Bellegarda et al. ..................... | 382/187 |
| 5,568,591 | 10/1996 | Minot et al. .............................. | 706/25 |
| 5,569,565 | 10/1996 | Minakata ................................. | 382/187 |
| 5,730,468 | 3/1998 | Wirtz ....................................... | 283/70 |
| 5,818,955 | 10/1998 | Smithies et al. ......................... | 382/115 |
| 5,818,963 | 10/1998 | Murdock et al. ........................ | 382/187 |
| 5,828,772 | 10/1998 | Kashi et al. ............................. | 382/119 |

FOREIGN PATENT DOCUMENTS 0 391 044  10/1990  European Pat. Off. .

OTHER PUBLICATIONS

Yukio Sato, et al., IEEE, vol. Part 2, No. Proc. 6, pp. 823–826, Oct. 19, 1982, "Online Signature Verification Based on Shape, Motion, and Writing Pressure", Proceedings of the International Joint Conference on Pattern Recognition, Munich, Oct. 19–22, 1982.

Juan D. Penagos, et al., IEEE, pp. 451–457, Apr. 11, 1996, "An Efficient Scheme for Dynamic Signature Verification", Proceedings of Southeastcon, Bringing Together Education, Science and Technology, Tampa, Apr. 11–14, 1996.

*Primary Examiner*—Leo H. Boudreau
*Assistant Examiner*—Gregory Desire
*Attorney, Agent, or Firm*—Oblon, Spivak, McClelland, Maier & Neustadt, P.C.

[57] ABSTRACT

A handwritten character recognition method including the steps of acquiring coordinate information and writing pressure information relating to a handwritten character string as three-dimensional time series information, correcting the handwritten character string data through use of a warping function in order to minimize the overall degree of difference among a plurality of sets of handwritten character string data, and comparing the thus-corrected character string data with registered handwritten character string data by dynamic programming matching so as to obtain the overall degree of difference between the handwritten character string data and the corrected handwritten character string data. The method further includes the steps of extracting strokes from the character string, acquiring coordinate information and writing pressure information with regard to each of the strokes corresponding to the character string to be checked, and summing cumulative errors between corresponding paired strokes of the character strings to be compared in terms of coordinate information and writing pressure information, to thereby calculate from the cumulative values the overall degree of difference between the handwritten character string data and registered handwritten character string data. Further, the degree of difference in fluctuation of writing movement is calculated from cumulative values of the fluctuation speed of writing movement through use of time axis warping functions. These degrees of difference are added to discriminant elements.

9 Claims, 5 Drawing Sheets

HANDWRITTEN CHARACTER VERIFICATION METHOD AND APPARATUS THEREFOR

BACKGROUND OF THE INVENTION

1. Field of the Invention

The present invention relates to a handwritten character recognition method, and more particularly to a signature verification method and to an apparatus for verifying the authenticity of a signature through combination of writing pressure information and coordinate information relating to handwritten characters.

2. Description of the Prior Art

A handwritten character recognition method by which written characters are recognized has been utilized as an input method for word processors or a signature verification method for specifying a writer. Under a handwritten character recognition method which has already been in actual use as an input method, characters are input in the block style under specified constraints on the style of typeface, and the thus-input characters are converted into coordinate information. The thus-converted coordinate information is verified by comparison with coordinate information relating to character data which have been stored beforehand. As a result of verification, the characters are recognized as matched. If characters are carefully written in the block style at comparatively slow speed, the characters can be sufficiently recognized through use of only coordinate information because under such conditions each of the strokes of the characters becomes clear by virtue of visual feedback to the writer and hence the shape of the characters becomes stable.

In contrast, in a case where the character recognition method is applied to an input method which does not pose any restriction on the style of typeface at the time of input of characters or to a signature verification method, there must be recognized not only characters written in the block type but also cursively written characters. When characters are cursively written, writing movement becomes faster and does not involve any substantial visual feedback to the writer. In this case, the characters become less identifiable, and separation of a resultantly acquired pattern into strokes becomes difficult. This is because of greater expansion or contraction of the pattern in the direction of the time axis or in the direction of stroke, or the difference between the input pattern and a pre-registered pattern. For this reason, an extremely low matching rate is obtained through use of only the coordinate information, rendering the characters unidentifiable.

Another method is to enable recognition of characters without involving the separation of characters into strokes by application of coordinate information and writing pressure. This method employs a pattern matching technique called dynamic programming (DP) matching, which takes into consideration variations in the coordinate information stemming from variations in writing action.

In the dynamic programming matching technique, variations in the writing movement are corrected with regard to the time axis or the arc length axis through use of a warping function which minimizes a cumulative difference between patterns to be checked. Patterns are matched with each other on the basis of the coordinates and writing pressure that have been corrected so as to compensate variations in the writing movement, thereby enabling recognition of cursively handwritten characters.

Verification based on the addition of writing pressure information to coordinate information or normalization of input patterns by DP matching contributes to an improvement in the recognition rate of handwritten characters. However, in the case of application of the dynamic programming matching technique to recognition of cursively written characters or signature verification, a false signature may be erroneously recognized as a genuine signature. Therefore, in its present form, the dynamic programming matching technique cannot be put into practical use.

Japanese Patent No. 1,822,532 [Japanese Patent Publication (kokoku) No. 5-31798] entitled "A Method of Recognizing Handwritten Characters Online" describes a practical technique that is based on dynamic programming matching. Under this method, when the degree of difference between a registered pattern and an input pattern of handwritten characters is calculated by use of the dynamic programming matching technique, coordinate information and writing pressure information are simultaneously processed by the assignment of optimum weighting coefficients to the coordinate information and writing pressure information. As a result, the difference is reduced, which in turn contributes to an improvement in the verification rate of authenticity and a reduction in processing time.

As mentioned previously, even in the case of unclear characters which cannot be separated into strokes, processing of the coordinate information and writing pressure information relating to handwritten characters enables recognition of the characters. Further, even in the case of cursively handwritten characters, the characters can be recognized in practice, as a result of a further improvement in the dynamic programming matching technique that corrects the cumulative difference so as to compensate variations in writing movement.

Figure 1:
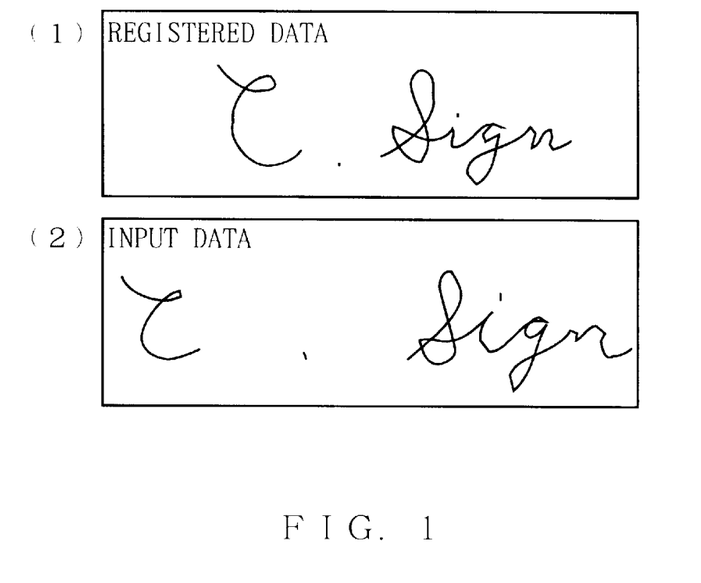
FIG. 1 is an explanatory diagram showing character strings written by the same writer.

However, there is a case where even the foregoing method fails to compensate variations in writing movement, to thereby cause recognition errors. FIG. 1 is a diagrammatic representation showing examples of character strings written by the same writer. FIG. 1(1) shows a character string which is registered as the reference for verification, and FIG. 1(2) shows an example input character string. As can be seen from the drawings, the pitch between characters is likely to change depending on a change in the environment where the writer writes characters. If the change in pitch between the characters is significant, the change cannot be compensated by correction of the position or size of the characters and is accumulated as an error of coordinates, thereby reducing the verification rate.

SUMMARY OF THE INVENTION

An object of the present invention is to provide a method of preventing a reduction in a verification rate even when the pitch between characters is likely to change. To accomplish the foregoing object, according to a first aspect of the present invention, there is provided a handwritten character recognition method by which the matching of characters is determined by acquisition of coordinate information and writing pressure information relating to a handwritten character string as three-dimensional time series information, and by comparison of the acquired three-dimensional time series information with handwritten character string data registered beforehand. The method comprises the steps of acquiring coordinate information and writing pressure information relating to the handwritten character string as three-dimensional time series information; correcting the acquired handwritten character string data through use of warping functions in order to minimize a cumulative error between the handwritten character string data and the registered handwritten character string data; and comparing the thus-corrected character string data with the registered handwritten character string data by dynamic programming matching so as to obtain the overall degree of difference between the corrected handwritten character string data and the registered handwritten character string data. Determination as to whether the handwritten character string is genuine or false is made on the basis of the overall degree of difference between the corrected handwritten character string data and the registered handwritten character string data, the degree of character-by-character difference between the corrected handwritten character string data and the registered handwritten character string data, as well as the degree of difference in fluctuation of writing movement Various types of methods can be used as an authenticity identification method, and the following method is one example. In the first step, the degree of difference between the overall patterns of handwritten character strings is calculated. If the character string has no possibility of becoming a genuine signature because the degree of difference of the input character string exceeds a certain value, the handwritten character string is determined to be false and the process is then completed. In the second step, there is calculated the degree of difference between the handwritten character string data and the registered handwritten character string data with regard to the fluctuation of writing movement. If the degree of difference exceeds a threshold value, the handwritten character string is determined to be false, and the process is then completed. In the third step, the degree of difference between the input handwritten character string data and the registered handwritten character string data is calculated on a character-by-character basis. The degree of character-by-character difference is expanded on a three-dimensional map together with the overall degree of difference between the corrected handwritten character string data and the registered handwritten character string data, and the degree of difference in fluctuation of writing movement, whereby the input handwritten character string is determined to be genuine or false.

The degree of difference on each character between the input handwritten character string data and the registered handwritten character string data is calculated by extraction of characters from both the input handwritten character string data and the registered handwritten character string data; normalization of the position and size of each character; calculation of cumulative errors relating to coordinate and writing pressure between the character of the input handwritten character string data and the corresponding character of the registered handwritten character string data on a character-by-character basis; and summation of the cumulative errors. As a result, aerial components, which will be described later, included in the character are utilized as they are. Only the aerial component relating to the pitch between characters is corrected or removed.

Characters are extracted from the registered data by recognition of a pitch between characters on the basis of the information relating to the time of an aerial component and the distance over which a pen is moved, and determination of points of separation between the characters. With regard to the input handwritten character string data, corresponding points between the registered handwritten character string data and the input handwritten character string data are determined through use of the warping functions calculated for the purpose of correcting the overall signature with respect to the time axis. The portion of the input handwritten character string data corresponding to each character of the registered handwritten character string data is extracted.

The character-by-character degree of difference between the input handwritten character string data and the registered handwritten character string data has the following relationship with the overall degree of difference between the input handwritten character string data and the registered handwritten character string data. As the character-by-character degree of difference, there are calculated the cumulative errors of characters in terms of coordinate and writing pressure in consideration of the ratio of the number of data points of each character to the number of data points of the overall signature. When the cumulative errors of coordinate and writing pressure are calculated for each character, normalization is effected for each character with regard to position and size. The overall signature is corrected with respect to the time axis through use of the warping functions. In the case of a character which requires a very short period of time to write; e.g., a comma ",", the comma is normalized solely with regard to position but not to size.

The strength of fluctuation of writing movement associated with the registered handwritten character string data and the strength of fluctuation of writing movement associated with the input handwritten character string are calculated as a rate of variation in fluctuation by means of time axis warping functions, and the degree of difference in fluctuation of writing movement between the input handwritten character string data and the registered handwritten character string data is calculated from the accumulated value of the fluctuation rate.

Identification of written characters based on the dynamic programming matching technique utilizes only the degree of difference in sets of information relating to the shape of the characters corrected while removing variations in writing movement. However, in a case where an identification is made from a set of writers including the genuine writer, the identification has the disadvantage of judging handwritten characters to be genuine if the handwritten characters are the same in stroke order and character shape as the genuine characters written by the genuine writer. Such a disadvantage can be compensated by calculation of the degree of difference in writing movement from an accumulated total of amplitudes of the time axis warping functions, and by addition of the thus-calculated difference in writing movement to the elements used for the purpose of matching or verification as the degree of difference in writing movement.

DESCRIPTION OF THE PREFERRED EMBODIMENT

With reference to the accompanying drawings, an embodiment of the present invention will be described.

Handwritten character recognition according to the present invention involves acquisition of coordinate information and writing speed information relating to reference characters and arithmetic processing of these sets of information. To this end, there are needed means for measuring the coordinate information and writing pressure information relating to handwritten characters, and arithmetic processing means for processing the thus-obtained sample data. The coordinate information and writing pressure information measured by sampling the written characters at preset time intervals take the form of three-dimensional time series data. However, these sets of information are represented as data series comprising complex coordinate series and writing pressure series. The means for measuring the coordinate information and writing pressure information comprises; e.g., a stylus pen having a built-in pressure sensor and a digitizer for detecting the coordinates of the tip end of a pen.

With regard to the characters used as the standards for verification (i.e., registered characters) and characters to be checked, data are obtained by sampling of coordinate information and writing speed information at equal time intervals. The thus-obtained data are normalized to correspond to an equal number of sampling points and are further preliminarily normalized with regard to position and size. For example, in the case of lateral writing action, a pen is moved from left to right in many cases. Such constant motion may hinder verification of the characters. For this reason, it is desirable to calculate a uniform stroke component from the pattern and to subtract the thus-obtained uniform stroke component from the coordinate information normalized with regard to position and size.

The characters to be used as the standards for verification are registered beforehand. At this time, in order to facilitate arithmetic operation, there are registered data which are sampled at a constant number of sampling points. When characters are registered, data are acquired by the same characters, such as a signature, being written a plurality of times. Optimum data may be selectively registered. Discriminant elements obtained through dynamic programming matching or identification of handwritten characters can also be utilized when optimum data are selected.

The preliminarily-normalized coordinate information and writing pressure information are corrected by dynamic programming matching through use of time axis warping functions in order to minimize cumulative differences of the coordinate information and the writing pressure information with respect to the time axis. As a result, the degree of difference in coordinate information and the degree of difference in writing pressure are obtained, and the thus-obtained differences are taken as discriminant elements.

Alternatively, the coordinate information and the writing speed information can be checked through use of time series data which are sampled or converted at equal arc length pitches. If the degree of difference in writing motion is added to the discriminant elements, the coordinate information and the writing pressure information must be checked by means of time series data sampled at equal time intervals or converted time series data. When the coordinate information and the writing speed information are processed by dynamic programming matching, they may be simultaneously processed by the assignment of optimum weighting coefficients to the coordinate information and the writing speed information, as described in Japanese Patent No. 1,822,532 entitled "A Method of Recognizing Written Characters Online."

To obtain the degree of difference in coordinate information and the degree of writing pressure information with regard to a cursively and continually written portion (i.e., a stroke) of the character sequence, the character string is divided into strokes at every non-zero pressure portion on the basis of the coordinate and writing pressure information including the uniform stroke component. The information relating to the portion at which the character string is divided into strokes is referred to as an aerial component. In a case where the period of time required for an aerial component is short, the aerial component is deemed a gap included in one stroke; namely, an internal aerial component which appears within a single character. Such an aerial component combines partial strokes before and after the gap into one stroke. To make a determination as to whether or not the aerial component is a gap included in a stroke, the travel distance of the pen is also considered. If the travel distance is great, the aerial component is better taken as an inter-stroke aerial component.

In contrast, through use of time axis warping functions, the character string to be checked is divided into strokes on the basis of the stroke starting and end points extracted from the character sequence to be used as a reference for verification. The thus-extracted stroke is subjected to normalization with regard to position and size. A cumulative value is obtained by summation of the degree of difference of each stroke in terms of coordinate information and writing pressure information, which is performed in consideration of a ratio of each stroke to the overall character string, or a ratio of the number of sampling points or the length of sampling time of each stroke to those of the overall character string. The thus-obtained cumulative value is taken as a discriminant element.

Variations in writing movement with respect to the time axis are already eliminated from the cumulative errors of the coordinate information and writing pressure information calculated by dynamic programming matching. In contrast, the writing movement is contained in the time axis warping functions. The strength of fluctuation of the writing movement is calculated from the rate of fluctuation, or fluctuation speed of the time axis warping functions. A cumulative value of the strength of fluctuation of the writing motion is taken as a discriminant element.

A threshold value which allows accomplishment of the maximum recognition rate or identification rate is set for each of the discriminant elements. If there is obtained a value exceeding the threshold value, the input handwritten character string data are determined to be false. In a case where the handwritten character string identification method is utilized as a signature verification method, the risk of a false signature being erroneously judged to be a genuine signature will increase depending on the setting of the threshold value. Thus, the setting of the threshold value is critical. For this reason, a desirable threshold value setting system uses a discriminant function so as to allow easy setting and modification depending on the field of application. The handwritten character verification method may be applied to an input method for a character input system. The present invention is particularly effective for handling cursively written characters; e.g., blurred characters or those written by the running hand.

Under the handwritten character verification method according to the present invention, there are obtained three sets of discriminant elements; namely, the degree of difference in coordinate information and the degree of difference in writing pressure information which are obtained by a correction to minimize a cumulative difference in coordinate information and a cumulative difference in writing pressure information with regard to the time axis; the degree of difference in a cumulative value of fluctuation speed of the writing motion; and the degree of difference of each stroke in terms of coordinate information and writing pressure information obtained through correction of the handwritten characters with regard to position and size. The input handwritten character string may be identified or determined from all the discriminant elements after they have been obtained. Alternatively, for example, the input handwritten character string is identified or verified on the basis of the degree of difference in coordinate information and the degree of difference in writing pressure information of the entire character string. If the input handwritten character string is evidently judged to be false, the verification operation is completed. Otherwise, subsequently, the degree of difference between the input handwritten character string and the registered handwritten character string is calculated for each stroke, thereby determining the input handwritten character string. If the input handwritten character string is evidently judged to be false, the verification operation is completed. Such step-by-step verification enables omission of redundant processing.

It is desirable to take as discriminant elements the degree of difference in coordinate information and the degree of difference in writing pressure information relating to the strokes of the character string, as well as the speed of fluctuation of writing motion. Even in a case where any one of the discriminant elements is added to verification, an improvement in verification rate can be expected.

FIG. 1 is an explanatory drawing showing character strings written by the same writer. The section (1) of FIG. 1 shows a character string to be registered as a reference for verification, and the section (2) of FIG. 1 shows an input character string. Based on the assumption that a signature is verified through use of the handwritten character verification method according to the present invention, and that the degree of difference in coordinate information and the degree of difference in writing pressure information relating to stable strokes of a signature are utilized as discriminant elements, even at the time of entry of a character string having a wide character pitch such as that shown in the section (2) of FIG. 1, the input character string can be identified to be genuine in comparison with a registered character string such as that shown in the section (1) of FIG. 1.

In the handwritten character recognition method according to the present invention, the degree of difference in coordinate information and the degree of difference in writing pressure information relating to stable strokes constituting the character string are employed as discriminant elements. Therefore, an error due to character pitch is eliminated, and input handwritten characters having a large character pitch may be identified even when they are input in a certain writing environment.

The strokes of the character string do not always correspond to character units. A character string to be checked as a whole is corrected with regard to the time axis by means of warping functions. The character string is divided into strokes according to the points which correspond to the starting points and the end points of the strokes extracted from the reference character string. In a case where the character string include time axis variations which are too large to be compensated by the warping functions, strokes of the character string to be checked will take the form of a pattern in capable of expressing a character unit. More specifically, in a pattern including variations in time between characters in excess of the range where the changes can be corrected by the warping functions, it is evident that variations in character pitch cannot be compensated. In signature verification, it is desirable to judge variations in excess of a certain range to be false.

Figure 2:
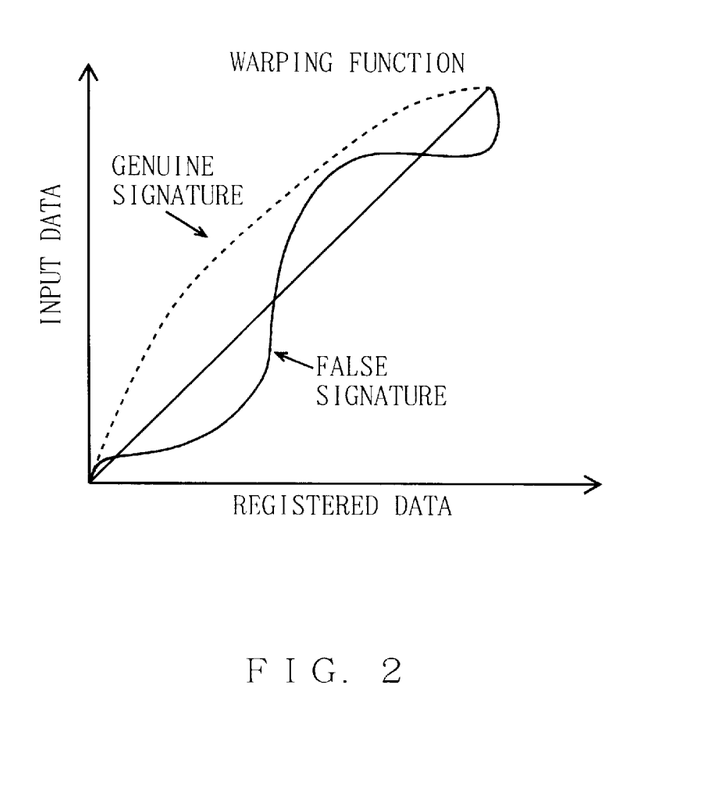
FIG. 2 is a plot showing a time axis warping function for use with the character string.

FIG. 2 is an explanatory drawing showing one example of time axis warping functions of character strings. A broken line indicates a time axis warping function of a character string to be judged a genuine signature, and a solid line indicates a time axis warping function of a character string to be judged a false signature. A straight line in FIG. 2 indicates a time axis warping function of a registered character string to be used as a reference for verification which is fixed along the time axis. In a case such as that shown in the drawing, the distance between a line represented by the time axis warping function of the character string to be used as a reference for verification, or a diagonal line, and a curved line represented by the time axis warping function of the character string to be checked becomes smaller in the case of a genuine signature but greater in the case of a false signature. In contrast, a signature is verified by the handwritten character recognition method according to the present invention, and a cumulative value of fluctuation speed of writing movement is taken as the degree of difference. As a result, an input signature can be checked in consideration of the fact that the fluctuation of the time axis warping function of the genuine signature is smaller and more stable compared to a false signature.

The handwritten character verification method according to the present invention uses the fluctuation speed of writing movement as a discriminant element. Therefore, a local variation, such as temporary suspension of movement of the pen at the beginning of writing of the character string, does not affect the overall warping functions. Accordingly, a genuine signature is identified at a stable high matching rate.

Figure 3:
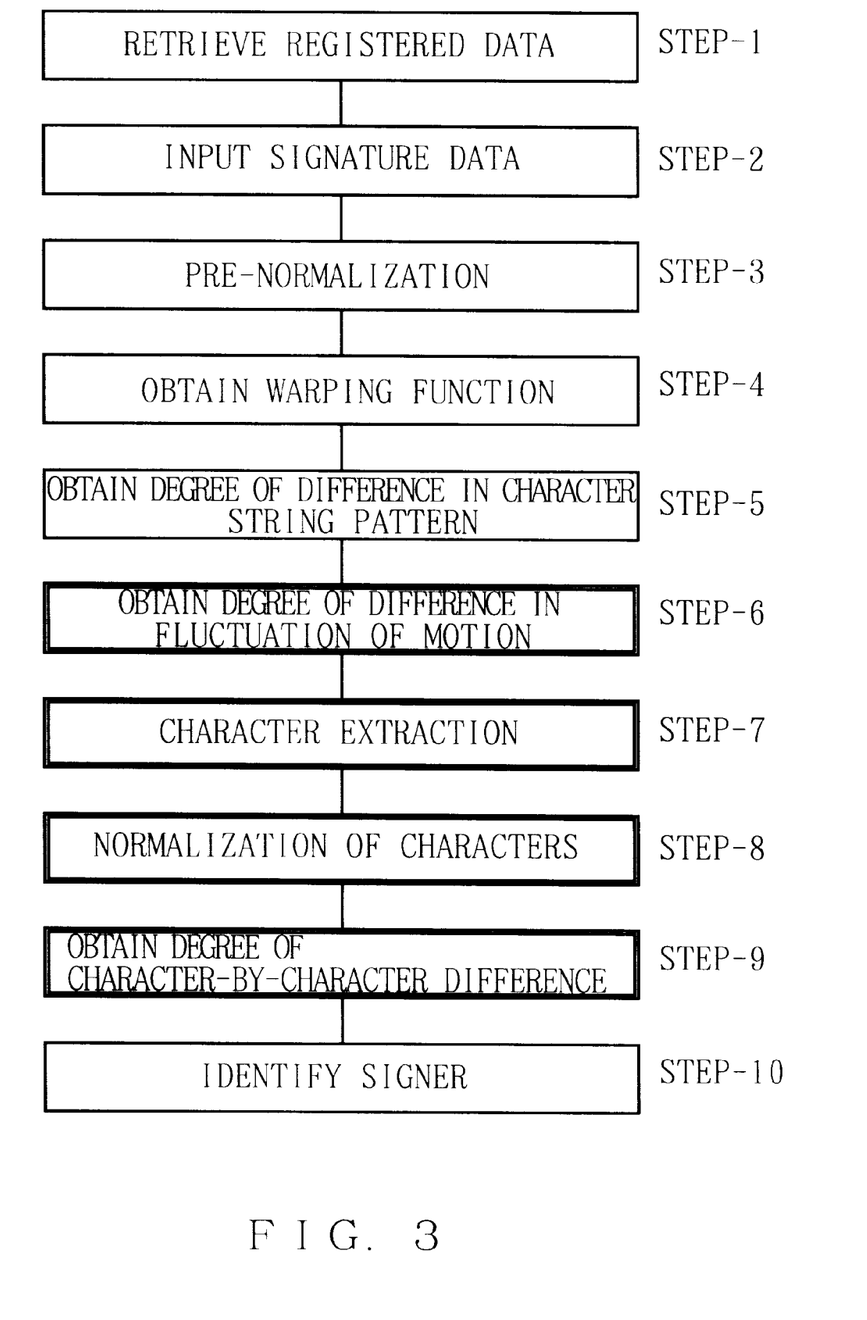
FIG. 3 is a flowchart showing procedures followed in signature verification in an embodiment of a handwritten character recognition method according to the present invention.

FIG. 3 is a flowchart for explaining the procedures followed in signature verification in an embodiment of a handwritten character recognition method according to the present invention. An embodiment of the present invention will now be described.

(Step 1: Retrieving Registered Data)

Before signature verification is commenced, a genuine signer writes his/her signature as registered data, whereby registered signature character string data are prepared. The registered signature string data are retrieved in the form of three-dimensional time series data, as shown below, in which the coordinates (x, y) and the writing pressure (P) are taken for sampling points whose the number is L.

$$\{z_\gamma(l), p_\gamma(l)\}_{l=1}^{L}$$

As represented by the following Equation 2, the three-dimensional time series data are expressed as complex coordinate series:

$$z_\gamma(l) = x_\gamma(l) + i y_\gamma(l) \quad i = \sqrt{-1}$$

The registered data that are subjected to preliminary normalization with regard to position and size are represented as follows:

$$\{z^*_\gamma(l), p^*_\gamma(l)\}_{l=1}^{L}$$

(Step 2: Signature Data Input)

Figure 4:
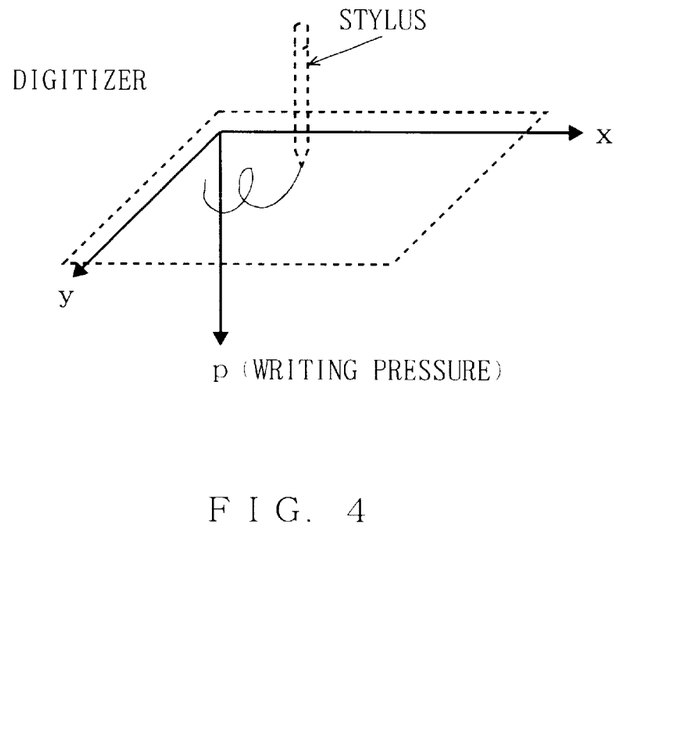
FIG. 4 is an explanatory diagram showing the entry of signature data in signature verification in the embodiment of the handwritten character recognition method according to the present invention.

FIG. 4 is a diagrammatic representation showing a system of inputting signature data employed in the handwritten character recognition method according to the present embodiment. As shown in the drawing, at the time of entry of signature data, the position of the tip end of a stylus pen on the plane (a two-dimensional area) of a digitizer is measured as coordinates (x, y) through use of the digitizer, a tablet, and the stylus pen. The pressure applied to the surface of the digitizer by the tip end of the stylus pen at that time is sampled at given time intervals as writing pressure (p) through use of a built-in pressure sensor of the stylus pen, whereby the writing pressure information is acquired as three-dimensional time series information.

The thus-sampled data are expressed as data, such as $\{x(t), y(t), p(t); t=1, 2, \ldots T\}$, which include both coordinate information and writing pressure information, wherein T indicates the number of sampling points, and the data are sampled at equal time intervals.

Using the numerical values of the thus-acquired signature data, complex coordinate series $z(t)=x(t)+iy(t)$, where $t=1, 2, \ldots T$. The signature data are newly described as $$\{z(t), p(t)\}_{t=1}^{T}$$

(Step 3: Preliminary Normalization)

With respect to the thus-obtained signature data, new data series expressed as follows are calculated so as to correspond to given equal time intervals or an equal number of sampling points.

$$\{z(l), p(l)\}_{l=1}^{L}$$

where L indicates the number of sampling points, and each of signatures is supposed to have a constant number of sampling points. New complex coordinate series are defined as follows for the purpose of preliminary normalization.

$$z_1(l) = \frac{z(l) - zg}{\|z(l) - zg\|}$$

where zg represents the centroid of a signature pattern and is defined as $$zg = \frac{1}{L}\sum_{l=1}^{L} z(l)$$

Also, the symbol $\|\cdot\|$ represents the complex coordinate series norm, and is $$\|z(l)\|^2 = \frac{1}{L}\sum_{l=1}^{L} |z(l)|^2$$

In many cases, a signature is usually written from left to right, and the coordinates of a signature tend to increase in a certain direction with lapse of time. From the viewpoint of checking a signature, it is desirable to eliminate such fixed motion. Accordingly, the uniform stroke components are eliminated from the coordinate data. The uniform stroke component is defined as $$z_2(l) = \xi \cdot \frac{(l-1)}{L} + \eta$$

The complex coordinate series from which the uniform stroke component has been removed are $$\{z^*(l) = z_1(l) - z_2(l)\}_{l=1}^{L}$$

Symbols $\xi$ and $\eta$ are defined as follows in order to minimize $\|z^*(l)\|$:

$$\xi = \frac{12}{L^2}\sum_{l=1}^{L} z_1(l) \cdot (l-1)$$

and $$\eta = -\frac{\xi}{2}$$

The complex coordinate series obtained through the foregoing operations $$\{z^*(l)\}_{l=1}^{L}$$

are referred to as normalized complex coordinate series and will be hereinafter referred to simply as complex coordinate series. Similarly, writing pressure information is normalized as follows:

$$p^*(l) = \frac{p(l)}{\|p(l)\|}$$

The writing pressure series newly obtained as a result of normalization $$\{p^*(l)\}_{l=1}^{L}$$

are hereinafter referred to as normalized writing pressure series and will be hereinafter referred to simply as writing pressure series. The thus-sampled input data are preliminarily normalized with regard to the number of sampling points and position and are expressed as $$\{z^*(l), p^*(l)\}_{l=1}^{L}$$

(Step 4: Obtaining of Warping Functions)

(Step 5: Obtaining of the Degree of Difference in Character String Pattern)

The degree of difference in coordinate and the degree of difference in writing pressure are obtained with regard to the registered signature data and the input signature data, respectively. At this time, weighting coefficients corresponding to coordinate and writing pressure are assigned to the registered signature data and the input signature data. To minimize a cumulative error relating to coordinate and writing pressure between patterns of both the registered and input signature data with respect to the time axis, the input signature data are corrected by dynamic programming matching.

Taking the registered signature data as a pattern A and the input signature data as a pattern B, the degree of difference between the i-th point of the pattern A and the j-th point of the pattern B is defined as $$d^2(i,j) = (1-W_p)|z^*_A(i) - z^*_B(j)|^2 + W_p|p^*_A(i) - p^*_B(j)|^2$$

through use of the coordinate series and the writing pressure series. Here, Wp is a weighting which satisfies $0 \leq Wp \leq 1$ and relates to writing pressure series, and (1-Wp) is a weighting for coordinate series.

In consideration of non-linear conversion between the patterns A and B, distance function representing the difference between the patterns is defined as follows $$D_{shape-1}(A, B) = \min_{\tau i, \tau j} \sum_{l=1}^{L} d(\tau i(l), \tau j(l))$$

where $\tau i(l)$, $\tau j(l)$ are functions which define the relation between the patterns A and B, and the point-to-point correspondence between the two patterns A and B is obtained so as to minimize the value of the function $D_{shape-1}$ (A, B).

The functions $\tau i(l)$, $\tau j(l)$ are referred to as time-axis warping functions, whilst the minimized $D_{shape-1}$ (A, B) function is referred to as a pattern-to-pattern matching distance. The following conditions are set with respect to the time axis warping functions $\tau i(l)$, $\tau j(l)$.

(1) Monotonicity:

Even in a case where every writer has his own stroke order, based on the assumption that the same writer will not change the stroke order of the same characters, the warping functions will be monotonous increasing functions.
Therefore, $\tau i(l-1) \leq \tau i(l)$, $\tau j(l-1) \leq \tau j(l)$ are set.

(2) Continuity:

The coordinates and writing pressure continuously change from one stroke to another stroke, and hence the warping functions are also continuous functions.
Therefore, $|\tau i(l)-\tau i(l-1)| \leq 1, |\tau i(l)-\tau j(l-1)| \leq 1$ are set.

(3) Boundary Conditions:

In the present embodiment, the character pattern starting and end points are fixed. Therefore, the boundary conditions are set as follows:

$\tau i(l)=\tau j(l)=1$ $\tau i(L)=\tau j(L)=L.$

In the present embodiment, the time axis of the pattern A of the registered signature data is fixed to $\tau i(l)=1$, and the pattern B of the input signature data is warped with respect to the time axis. The pattern-to-pattern matching distance $D_{shape-1}$ (A, B) is taken as the first degree of difference in shape between the patterns A and B.

(Step-6: Obtaining of Degree of Difference in Fluctuation of Motion)

In signature verification, the difference in writing motions itself; namely, the degree of difference relating to motion, becomes a very effective discriminant element. The degree of difference in change between the registered signature pattern and the input signature pattern with respect to the time axis is contained in the warping functions $\tau i(l)$ and $\tau j(l)$.

Figure 5:
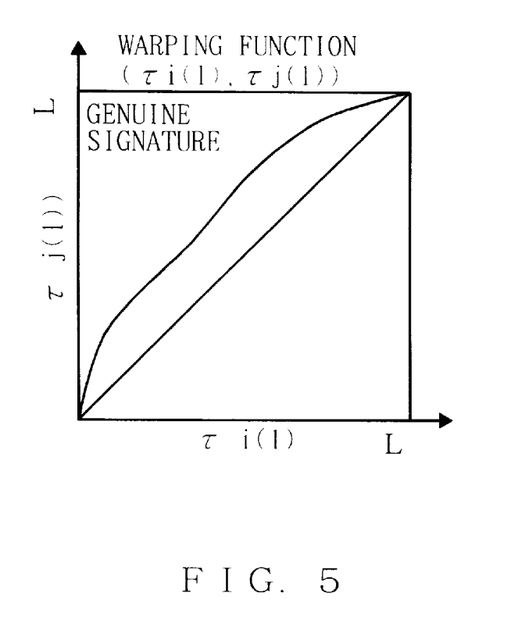
FIG. 5 is a plot showing a time axis warping function for a genuine signature formed in the embodiment of handwritten character recognition method according to the present invention.
Figure 6:
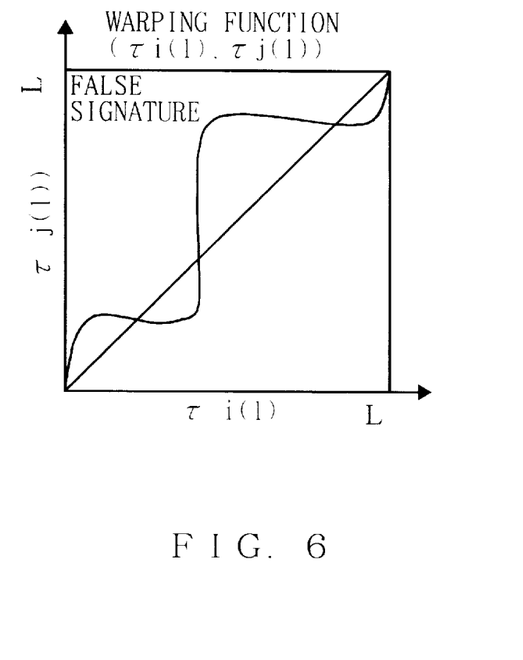
FIG. 6 is a plot showing a time axis warping function for a false signature formed in the embodiment of the handwritten character recognition method according to the present invention.

FIG. 5 is a plot showing a time axis warping function for a genuine signature employed in the embodiment of handwritten character recognition method, and FIG. 6 is a plot showing a time axis warping function for a false signature employed in the embodiment of the handwritten character recognition method. When the patterns A and B completely match each other, the warping function takes the form of a straight line having a slope of one, such as that represented in the plot shown in FIG. 5; i.e., a diagonal line.

The pattern of signature data usually includes a nonlinear error in the direction of the time axis. Provided that the warping functions $\tau i(l)$ and $\tau j(l)$ are represented as those shown in the drawing, the error takes the form of a curve with respect to the diagonal line. The variation with respect to the diagonal line represents the difference in writing motion between the registered signature pattern and the input signature pattern with respect to the time axis. When the signature written by the false signer is compared with the signature written by the true signer, an error in the false signature tends to become greater (see FIGS. 5 and 6).

Variations with respect to the diagonal line represent the difference between the registered signature pattern and the input signature pattern with respect to the time axis. In general, the degree of difference in motion can be represented as a cumulative difference between the diagonal line and the warping functions $\|\tau j(l)-\tau i(l)\|$.

Figure 7:
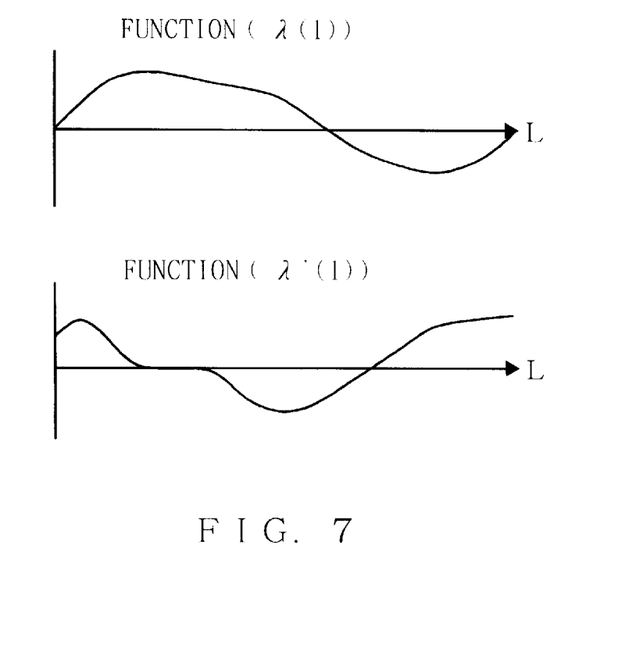
FIG. 7 is a plot showing variations in the warping functions employed in an embodiment of the signature verification method according to the present invention.

However, in the case of the cumulative difference in the warping functions, local variations greatly affect the magnitude of variations in the overall signature, increasing the degree of difference in motion. Because of this, it is necessary to define a distance function which prevents cumulative local variations. To this end, the amount of variation in the warping functions with respect to the diagonal line is defined as $\lambda(l)=\tau j(l)-\tau i(l)\tau i(l)=1,2,\ldots,L.$ The amount of variation represents the distance between the diagonal line and the warping functions at a certain time. The strength of variation corresponds to the speed at which the warping functions depart from the diagonal line. The speed is calculated as the first derivative $\lambda'(l)$ of the function $\lambda(l)$. FIG. 7 is a plot showing the amount of change in the warping function employed in the embodiment of the signature verification method. Provided that the amount of variation in the warping functions is represented by a function $\lambda(l)$, a local change is prevented from affecting the overall signature by calculation of the first derivative $\lambda'(l)$. From the five-point formula for numerical differentiation, the first derivative $\lambda'(l)$ is $$\lambda'(l) = \frac{1}{12}(\lambda(l-2) - 8\lambda(l-1) + 8\lambda(l+1) - \lambda(l+2))$$

Taking $\lambda'(l)$ as a distance function, the degree of difference in motion between the patterns A, B is determined as $D_{motion}(A, B)=\|\lambda'(l)\|.$ (Step 7: Character Extraction)

Figure 8:
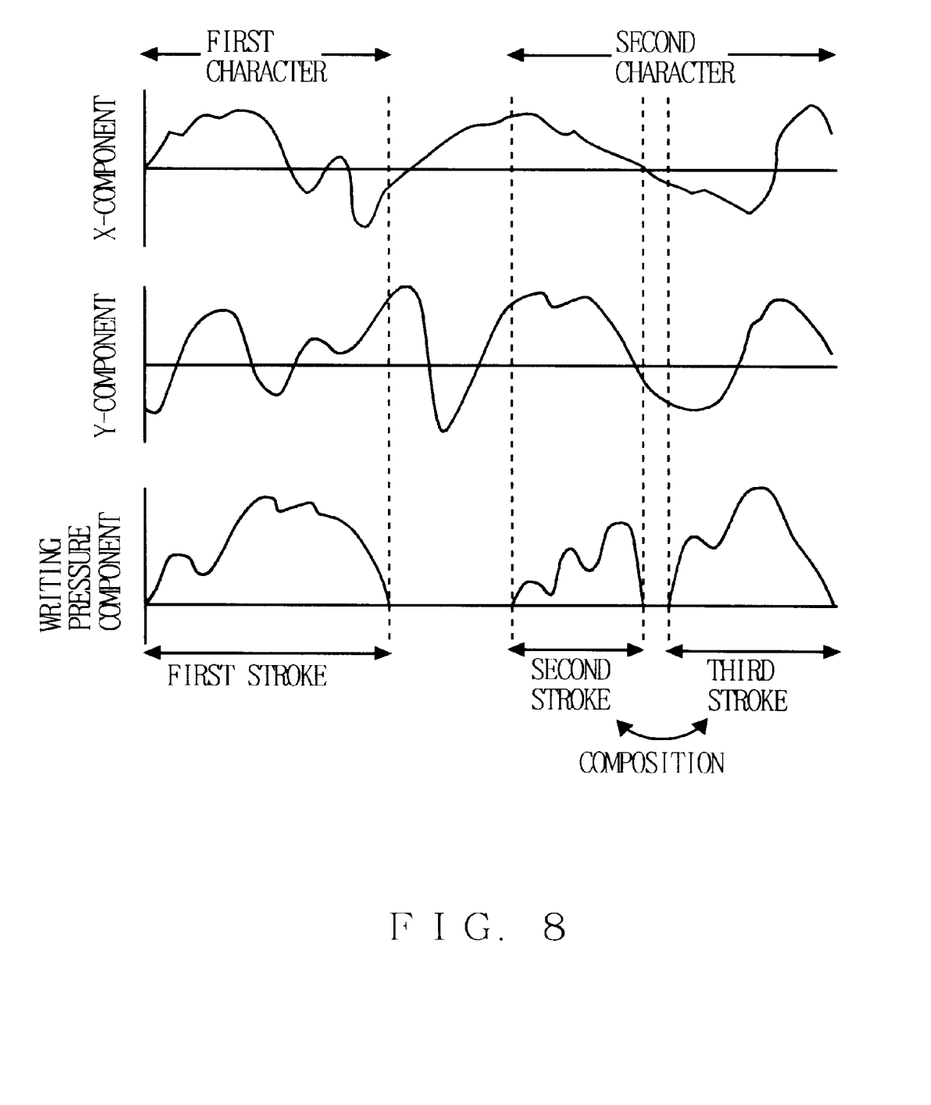
FIG. 8 is a plot showing variations in coordinate and writing pressure with time in the embodiment of the handwritten character recognition method according to the present invention.

To extract a character from the signature data, strokes are extracted from the overall signature of the registered signature data, and a character is extracted from the strokes. FIG. 8 is a plot showing variations in coordinate and writing pressure with time in the embodiment of the handwritten character recognition method. In the signature data, coordinate components and writing pressure components are divided into three segments; first stroke, second stroke, and third stroke by aerial components whose writing pressure is zero.

In a case where the same signer writes a familiar signature, he or she tends to write one character or components, such as a given name or a surname, all at once, thereby resulting in writing motion in which the character pitch or aerial components relating to those portions become stable. In view of the foregoing fact, the space between extracted strokes; namely, the space in which a writing pressure of 0 occurs for a very small period of time, is taken as a gap included in a character. In contrast, the space in which the aerial component arises for a certain period of time, or the space in which the travel distance of the pen is longer than that a certain distance, is taken as a character pitch. Under these conditions, characters are extracted.

Time is in proportion to the number of data points. Therefore, in the case of an aerial component in which the number of data points is smaller than a certain preset value $SA_{min}$, such an aerial component is taken as a gap between the strokes constituting a character, and a new stroke is prepared by combination of the current stroke and another stroke before or after the current stroke. Through such processing, a character of the signature is prepared from the thus-prepared stroke.

In the drawing, the period of time required by an aerial component existing between the first stroke and the second stroke has a certain length, and the number of data points is larger than preset value SAmin. Therefore, the first stroke is extracted, as is. In contrast, with regard to an aerial component existing between the second stroke and the third stroke, the number of data points is smaller than the preset value SAmin. For this reason, the stroke is combined to another stroke, thereby extracting the second character. From the time series data which represent the pattern A of the registered signature data and are expressed as $$\{z_A(l), p_A(l)\}_{l=1}^{L}$$

the m-th character is extracted and is expressed as $$S_A(m) = \{z_A(k), p_A(k)\}_{k=Ls(m)}^{Le(m)}$$

wherein M indicates the number of characters constituting the pattern A, Ls(m) indicates the starting point of character S(m) (corresponding point of the pattern A), and Le(m) indicates the end point of the character S(m). A group of characters constituting the pattern A are defined as $$\{S_A(m)\}_{m=1}^{M}$$

Characters of the pattern B of the input signature data are extracted so as to correspond to the characters of the pattern A. Corresponding points are obtained through use of the warping functions τi(l),τj(l) calculated in order to determine the first degree of difference in shape.

From the time series data which represent the pattern B of the input signature data and are expressed as $$\{z_B(l), p_B(l)\}_{l=1}^{L}$$

the m-th character is extracted and is expressed as $$S_B(m) = \{z_B(k), p_B(k)\}_{k=\tau(Ls(m))}^{\tau(Le(m))}$$

A group of characters constituting the pattern B are defined as $$\{S_B(m)\}_{m=1}^{M}$$

Here, the warping functions are τ(l)=τj(l), where τi(l)=1, 2, . . . L.

(Step 8: Normalization of Characters)

The coordinate series of the thus-extracted characters are normalized with regard to position and size. The normalized coordinate series are expressed as follows for the respective patterns A and B:

$$\{S^*_A(m)\}_{m=1}^{M}$$

$$S^*_A(m) = \{z^*_A(k), p^*_A(k)\}_{k=Ls(m)}^{Le(m)}$$

$$\{S^\cdot_B(m)\}_{m=1}^{M}$$

and $$S^*_B(m) = \{z^*_B(k), p^*_B(k)\}_{k=\tau(Ls(m))}^{\tau(Le(m))}$$

At this time, if the number of data points of the character is smaller than a certain number, the coordinate series are not normalized with regard to size but with regard to only position. A character which has a small number of data points; namely, a character which is written within a very short period of time, takes a simple shape such as ",", or "-" in many cases. For this reason, if the coordinate series of such a character are normalized with regard to size, a variation tends not to be compensated but to be increased.

(Step 9: Obtaining Degree of Character-by-character difference)

The degree of difference between the m-th character of the pattern A of the registered signature data and the corresponding character of the pattern B of the input signature data is defined as $$d_s^2(m) = \frac{1}{Le(m) - Ls(m) + 1} \sum_{k=Ls(m)}^{Le(m)} (1 - w_p)|z^*_A(k), z^*_B(\tau(k))|^2 + w_p |p^*_A(k), p^*_B(\tau(k))|^2$$

where wp(0≦wp≦1) is weighting relating to the writing pressure series. With regard to the overall degree of difference between the registered signature and the input signature, the degrees of difference between the registered signature data and the input signature data are added for each character at a rate of the number of data points of each character to the number of data points of the overall signature, and the degrees of difference are summed as the degree of character-by-character difference expressed as $$D_{shape-2}(A, B) = \frac{\sum_{m=1}^{M} d_s(m) \cdot (Le(m) - Ls(m) + 1)}{\sum_{m=1}^{M} (Le(m) - Ls(m) + 1)}$$

(Step 10: Identification of the Signer)

The authenticity of an input signature is determined by means of the degree of difference between character string patterns, the degree of difference in fluctuation of writing motion, and the degree of character-by-character difference between a registered character string pattern and the input registered string pattern. These three degrees of difference are three-dimensionally mapped, and the input signature is identified to be genuine or false through use of defined discriminant functions. At this time, it is possible to determine the authenticity of the input signature by inevitably obtaining the degree of difference. However, in consideration of matching time, the authenticity of the input signature can be performed step by step so that the authenticity of the input signature can be efficiently determined while the quantity of useless calculation is reduced.

Although the present invention appears to be directed to a matching technique based on the difference between single characters, the overall input signature is corrected with regard to the time axis through use of warping functions of the overall signature, and corresponding points of the overall signature are taken into consideration when characters are extracted. Further, the degree of difference takes into consideration the proportion of the characters forming the signature. Therefore, there can be obtained the degree of difference in which the writing motion throughout the signature is reflected.

Further, the degree of difference in coordinate information and the degree of difference in writing pressure information relating to stable strokes constituting a character string are taken as discriminant elements. As a result, errors stemming from a change in character pitch are eliminated. Even if a character string—in which a great change arises in character pitch —is input in the writing environment, the stable result of verification is obtained. Since the fluctuation speed of the writing movement is taken as a discriminant element, a local variation, such as temporary suspension of movement of the pen at the beginning of writing of the character string, has no affect as the difference in movement of the overall character string. Accordingly, a genuine signature is identified at a stable high matching rate.

What is claimed is:

1. A handwritten character recognition method by which the matching of characters is determined by acquisition of coordinate information and writing pressure information relating to a handwritten character string as three-dimensional time series information, and by comparison of the acquired three-dimensional time series information with handwritten character string data registered beforehand, the method comprising the steps of:

acquiring coordinate information and writing pressure information relating to the handwritten character string as three-dimensional time series information;

correcting the handwritten character string data through use of a warping function in order to minimize a cumulative error between the handwritten character string data and the registered handwritten character string data;

comparing the thus-corrected character string data with the registered handwritten character string data by dynamic programming matching so as to obtain the overall degree of difference between the corrected handwritten character string data and the registered handwritten character string data;

extracting characters from the registered handwritten character string data and the input handwritten character string data;

normalizing the thus-extracted characters on a character-by-character basis with regard to position and size;

calculating cumulative errors in coordinate and a cumulative error in writing pressure between the registered handwritten character string data and the input handwritten character string data for each character;

summing the cumulative errors for each character to thereby produce the degree of character-by-character difference between the corrected handwritten character string data and the registered handwritten character string data; and determining whether the handwritten character string is genuine or false from the overall degree of difference between the corrected handwritten character string data and the registered handwritten character string data, as well as from the degree of character-by-character difference between the corrected handwritten character string data and the registered handwritten character string data.

2. A handwritten character recognition method by which the matching of characters is determined by acquisition of coordinate information and writing pressure information relating to a handwritten character string as three-dimensional time series information, and by comparison of the acquired three-dimensional time series information with handwritten character string data registered beforehand, the method comprising the steps of:

acquiring coordinate information and writing pressure information relating to the handwritten character string as three-dimensional time series information;

correcting the handwritten character string data through use of a warping function in order to minimize a cumulative error between the handwritten character string data and the registered handwritten character string data;

comparing the thus-corrected character string data with the registered handwritten character string data by dynamic programming matching so as to obtain the overall degree of difference between the corrected handwritten character string data and the registered handwritten character string data;

calculating the strength of fluctuation of writing movement from the registered handwritten character string data and the input handwritten character string data as a rate of change in fluctuation through use of time axis warping functions;

calculating a cumulative value of the rate of change in fluctuation to thereby obtain the degree of difference in fluctuation of writing movement; and determining whether the handwritten character string is genuine or false from the overall degree of difference between the corrected handwritten character string data and the registered handwritten character string data, as well as from the degree of difference in fluctuation of writing movement.

3. A handwritten character recognition method by which the matching of characters is determined by acquisition of coordinate information and writing pressure information relating to a handwritten character string as three-dimensional time series information, and by comparison of the acquired three-dimensional time series information with handwritten character string data registered beforehand, the method comprising the steps of:

acquiring coordinate information and writing pressure information relating to the handwritten character string as three-dimensional time series information;

correcting the handwritten character string data through use of a warping function in order to minimize a cumulative error between the handwritten character string data and the registered handwritten character string data;

comparing the thus-corrected character string data with the registered handwritten character string data by dynamic programming matching so as to obtain the overall degree of difference between the corrected handwritten character string data and the registered handwritten character string data;

extracting characters from the registered handwritten character string data and the input handwritten character string data;

normalizing the thus-extracted characters on a character-by-character basis with regard to position and size;

calculating a cumulative error in coordinate and a cumulative error in writing pressure between the registered handwritten character string data and the input handwritten character string data on a character-by-character basis;

summing the cumulative errors of the respective characters to thereby produce the degree of character-by-character difference between the corrected handwritten character string data and the registered handwritten character string data;

calculating the strength of fluctuation of writing movement from the registered handwritten character string data and the input handwritten character string data as a rate of change in fluctuation through use of time axis warping functions;

calculating a cumulative value of the rate of change in fluctuation to thereby obtain the degree of difference in fluctuation of writing movement; and determining whether the handwritten character string is genuine or false from the overall degree of difference between the corrected handwritten character string data and the registered handwritten character string data, from the degree of character-by-character difference between the corrected handwritten character string data and the registered handwritten character string data, as well as from the degree of difference in fluctuation of writing movement.

4. A handwritten character recognition apparatus in which the matching of characters is determined by acquisition of coordinate information and writing pressure information relating to a handwritten character string as three-dimensional time series information, and by comparison of the acquired three-dimensional time series information with handwritten character string data registered beforehand, the apparatus comprising:

means for acquiring coordinate information and writing pressure information relating to the handwritten character string as three-dimensional time series information, correcting the handwritten character string data through use of a warping function in order to minimize a cumulative error between the handwritten character string data and the registered handwritten character string data, and comparing the thus-corrected character string data with the registered handwritten character string data by dynamic programming matching so as to obtain the overall degree of difference between the corrected handwritten character string data and the registered handwritten character string data;

means for extracting characters from the registered handwritten character string data and the input handwritten character string data, normalizing the thus-extracted characters on a character-by-character basis with regard to position and size, calculating cumulative errors in coordinate and a cumulative error in writing pressure between the registered handwritten character string data and the input handwritten character string data for each character, and summing the cumulative errors for each character to thereby produce the degree of character-by-character difference between the corrected handwritten character string data and the registered handwritten character string data, whereby a determination is made as to whether the handwritten character string is genuine or false, on the basis of the degree of difference between the corrected handwritten character string data and the registered handwritten character string data, as well as of the overall degree of character-by-character difference between the corrected handwritten character string data and the registered handwritten character string data.

5. A handwritten character recognition apparatus in which the matching of characters is determined by acquisition of coordinate information and writing pressure information relating to a handwritten character string as three-dimensional time series information, and by comparison of the acquired three-dimensional time series information with handwritten character string data registered beforehand, the apparatus comprising:

means for acquiring coordinate information and writing pressure information relating to the handwritten character string as three-dimensional time series information, correcting the handwritten character string data through use of a warping function in order to minimize a cumulative error between the handwritten character string data and the registered handwritten character string data, and comparing the thus-corrected character string data with the registered handwritten character string data by dynamic programming matching so as to obtain the overall degree of difference between the corrected handwritten character string data and the registered handwritten character string data; and means for calculating the strength of fluctuation of writing movement from the registered handwritten character string data and the input handwritten character string data as a rate of change in fluctuation through use of time axis warping functions and calculating a cumulative value of the rate of change in fluctuation to thereby obtain the degree of difference in fluctuation of writing movement, whereby a determination is made as to whether the handwritten character string is genuine or false, on the basis of the overall degree of difference between the corrected handwritten character string data and the registered handwritten character string data, as well as of the degree of difference in fluctuation of writing movement.

6. A handwritten character recognition apparatus in which the matching of characters is determined by acquisition of coordinate information and writing pressure information relating to a handwritten character string as three-dimensional time series information, and by comparison of the acquired three-dimensional time series information with handwritten character string data registered beforehand, the apparatus comprising:

means for acquiring coordinate information and writing pressure information relating to the handwritten character string as three-dimensional time series information, correcting the handwritten character string data through use of a warping function in order to minimize a cumulative error between the handwritten character string data and the registered handwritten character string data, and comparing the thus-corrected character string data with the registered handwritten character string data by dynamic programming matching so as to obtain the overall degree of difference between the corrected handwritten character string data and the registered handwritten character string data;

means for extracting characters from the registered handwritten character string data and the input handwritten character string data, normalizing the thus-extracted characters on a character-by-character basis with regard to position and size, calculating cumulative errors in coordinate and a cumulative error in writing pressure between the registered handwritten character string data and the input handwritten character string data for each character, summing the cumulative errors for each character to thereby produce the degree of character-by-character difference between the corrected handwritten character string data and the registered handwritten character string data; and means for calculating the strength of fluctuation of writing movement from the registered handwritten character string data and the input handwritten character string data as a rate of change in fluctuation through use of time axis warping functions and calculating a cumulative value of the rate of change in fluctuation to thereby obtain the degree of difference in fluctuation of writing movement, whereby a determination is made as to whether the handwritten character string is genuine or false, on the basis of the overall degree of difference between the corrected handwritten character string data and the registered handwritten character string data, of the degree of character-by-character difference between the corrected handwritten character string data and the registered handwritten character string data, as well as of the degree of difference in fluctuation of writing movement.

7. A medium on which recorded is a program for determining the matching of characters by acquisition of coordinate information and writing pressure information relating to a handwritten character string as three-dimensional time series information, and by comparison of the acquired three-dimensional time series information with handwritten character string data registered beforehand, the medium comprising the procedures for:

acquiring coordinate information and writing pressure information relating to the handwritten character string as three-dimensional time series information;

correcting the handwritten character string data through use of a warping function in order to minimize a cumulative error between the handwritten character string data and the registered handwritten character string data;

comparing the thus-corrected character string data with the registered handwritten character string data by dynamic programming matching so as to obtain the overall degree of difference between the corrected handwritten character string data and the registered handwritten character string data;

extracting characters from the registered handwritten character string data and the input handwritten character string data, normalizing the thus-extracted characters on a character-by-character basis with regard to position and size;

calculating cumulative errors in coordinate and a cumulative error in writing pressure between the registered handwritten character string data and the input handwritten character string data for each character;

summing the cumulative errors for each character to thereby produce the degree of character-by-character difference between the corrected handwritten character string data and the registered handwritten character string data; and making a determination as to whether the handwritten character string is genuine or false, on the basis of the overall degree of difference between the corrected handwritten character string data and the registered handwritten character string data, as well as of the degree of character-by-character difference between the corrected handwritten character string data and the registered handwritten character string data.

8. A medium on which recorded is a program for determining the matching of characters by acquisition of coordinate information and writing pressure information relating to a handwritten character string as three-dimensional time series information, and by comparison of the acquired three-dimensional time series information with handwritten character string data registered beforehand, the medium comprising the procedures of:

acquiring coordinate information and writing pressure information relating to the handwritten character string as three-dimensional time series information;

correcting the handwritten character string data through use of a warping function in order to minimize a cumulative error between the handwritten character string data and the registered handwritten character string data;

comparing the thus-corrected character string data with the registered handwritten character string data by dynamic programming matching so as to obtain the overall degree of difference between the corrected handwritten character string data and the registered handwritten character string data;

calculating the strength of fluctuation of writing movement from the registered handwritten character string data and the input handwritten character string data as a rate of change in fluctuation through use of time axis warping functions;

calculating a cumulative value of the rate of change in fluctuation to thereby obtain the degree of difference in fluctuation of writing movement; and determining whether the handwritten character string is genuine or false from the overall degree of difference between the corrected handwritten character string data and the registered handwritten character string data, as well as of the degree of difference in fluctuation of writing movement.

9. A medium on which recorded is a program for determining the matching of characters by acquisition of coordinate information and writing pressure information relating to a handwritten character string as three-dimensional time series information, and by comparison of the acquired three-dimensional time series information with handwritten character string data registered beforehand, the method comprising the steps of:

acquiring coordinate information and writing pressure information relating to the handwritten character string as three-dimensional time series information;

correcting the handwritten character string data through use of a warping function in order to minimize a cumulative error between the handwritten character string data and the registered handwritten character string data;

comparing the thus-corrected character string data with the registered handwritten character string data by dynamic programming matching so as to obtain the overall degree of difference between the corrected handwritten character string data and the registered handwritten character string data;

extracting characters from the registered handwritten character string data and the input handwritten character string data;

normalizing the thus-extracted characters on a character-by-character basis with regard to position and size;

calculating cumulative errors in coordinate and a cumulative error in writing pressure between the registered handwritten character string data and the input handwritten character string data for each character;

summing the cumulative errors for each character to thereby produce the degree of character-by-character difference between the corrected handwritten character string data and the registered handwritten character string data;

calculating the strength of fluctuation of writing movement from the registered handwritten character string data and the input handwritten character string data as a rate of change in fluctuation through use of time axis warping functions;

calculating a cumulative value of the rate of change in fluctuation to thereby obtain the degree of difference in fluctuation of writing movement; and determining whether the handwritten character string is genuine or false from the overall degree of difference between the corrected handwritten character string data and the registered handwritten character string data, from the degree of character-by-character difference between the corrected handwritten character string data and the registered handwritten character string data, as well as from the degree of difference in fluctuation of writing movement.

* * * * *